Nov. 7, 1939.   T. W. DIKE ET AL   2,178,566
PROCESS OF GLUING POROUS MATERIALS
Filed Aug. 11, 1936
Fig. 1.
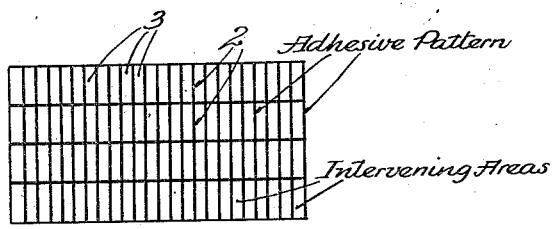
Fig. 2.
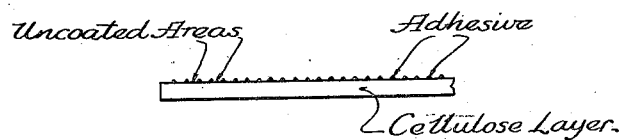
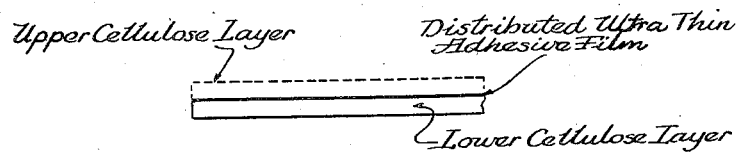
Fig. 3.
Inventors
Theodore W. Dike.
Harry Galber.
By Cushman Darby & Cushman
Attorneys Patented Nov. 7, 1939

2,178,566

UNITED STATES PATENT OFFICE 2,178,566

PROCESS OF GLUING POROUS MATERIALS

Theodore Williams Dike and Harry Galber, Seattle, Wash., assignors to I. F. Laucks, Inc., Seattle, Wash., a corporation of Washington Application August 11, 1936, Serial No. 95,460

15 Claims. (Cl. 144—309)

In the customary gluing of layers of porous or cellulosic materials by means of alkaline proteinous glues or adhesives, the technique has involved the application of the adhesive in a fluid state, its condition being such as to be easily applied and spread onto surfaces to be glued, this objective having been believed to require a marked degree of fluidity. This necessarily entails the use of a very considerable amount of water, and the water being in such high proportion and the glue thereby being in a fluid state, the water is introduced into the porous layers which are being glued, to an extent very materially raising their water-content; and in the further procedure, the assembled panels being stacked and placed for a number of hours in cold-pressure clamps for setting, the surplus of water must necessarily disseminate through the structure. The amount of water thus left is quite considerable, much above that which is desirable, unless corrected by an expensive additional operation of re-drying in a drier apparatus. Concomitant with the introduction of such large amounts of water with the adhesive in the case of cellulosic layers which are naturally highly absorbent, is the associate difficulty arising from expansion of the cellulose by the contacting glue water before the bond is formed, and its eventual contraction after the bond has been formed, this occurring of course more or less irregularly, and on final exposure to the air there is a marked tendency for development of surface hair checks or even cracks, which with many materials are rather serious. Furthermore, since the aqueous adhesive is of necessarily quite high alkaline content, the alkali, being carried widely and owing to local variation of porosity being carried quite irregularly by the water migration, tends to occasion stains on the portions, such as outside faces, other than those to which it was immediately applied by migrating through the faces to the surfaces, and in the case of checks or cracks there is usually considerable disfigurement from the stain in such areas. Also where a recess in a core layer for instance may have been filled with the alkaline adhesive during spreading, the migration of the alkali as carried by the water-dissemination occasions disfiguring stains on the outside surface opposite such points.

In an effort to get away from the difficulties occasioned by introduction of the large amounts of water concurrent with the aqueous alkaline adhesives, proposals have been made to apply the adhesive, instead of in thin spreadable form, by rolling out very stiff plastic doughs with sheeting rollers or by applying undispersed pulverulent forms of adhesive. These, however, are not operable with many forms of cellulose materials which it is desired to laminate or are limited to certain adhesives or lack adequate features of control or economy. The sheeting process of spreading for instance is inoperable except with glues of such heavy consistency that they cannot be spread at all with grooved roller spreaders, because the great pressure concentrated on the ridges between the grooves dents deeply into wood plies and breaks them up. With smooth sheeting rollers this trouble can be avoided, but it is impossible to produce an even uniform controllable spread at a low rate. Also the glue is so dense and non-fluid that even with the thinning and penetration-promoting influence of the heat of a hot press available, adequate penetration and bonding is only obtainable if the panels are pressed immediately after spreading. Thus neither the uniformity nor the quantity of spread are under control and there is no tolerance of assembly time. These difficulties have prevented practical success with this method.

Likewise the method of spreading the adhesive in undispersed pulverulent form presents the serious problem of requiring very costly spreading equipment to obtain uniformity and quantitative control of spread, as well as serious difficulty in obtaining adequate dispersion in situ and proper penetration, so that this method also has not been found capable of general commercial application. Referring also to the aforementioned cold pressing process there is a particular desideratum in being able to avoid all of the time-consuming and generally objectionable characteristics of such cold process gluing. In accordance with the present invention, it now becomes possible to effect a gluing operation with application of an alkaline aqueous adhesive in easily spreadable form, with exceptional control of uniformity even for thin spreads, without carrying undesirable excess water into the structure glued with attendant alkaline stains, and at the same time with particularly advantageous and rapid through-put, with resultant product containing a particularly low amount of moisture. Furthermore, delicate cellulose materials, including thin fancy veneers, etc., are thus capable of operation, without danger of damaging and occasioning excessive losses in rejections, etc.

For convenience and to avoid needless explanation of a very complex art, the following description is mainly confined to the particular glues and methods used in the manufacture of Douglas fir plywood, this being an important field for application of the inventions herein set forth, but we do not wish this to be construed in a limiting sense as the principles are of much broader usefulness and may be applied in other fields by those skilled in the adhesive art.

To the accomplishment of the foregoing and related ends, the invention, then, comprises the features hereinafter fully described, and particularly pointed out in the claims, the following description setting forth in detail certain illustrative embodiments of the invention, these being indicative however of but a few of the various ways in which the principle of the invention may be applied.

A numerical indication of glue consistency is commonly obtained with the MacMichael viscosimeter which expresses on an arbitrary scale the twisting force exerted on a standard wire suspending a standard plunger definitely immersed in a known diameter cup of glue rotated at fixed speed while the upper end of the wire is held stationary. In the following description and claims the viscosity measurement numbers are obtained using a one centimeter brass plunger, immersed three centimeters in a six centimeter diameter cup rotated at twenty R. P. M. As no single wire is capable of measuring a wide range, wires of different gauge such as No. 26, No. 22, and No. 18 are used, but their readings are convertible to a hypothetical equivalency with a light wire such as No. 26, by multiplying the readings by a difference factor, for instance multiplying the No. 18 readings by 37 or the No. 22 readings by 6.5 converts them to a fairly comparable hypothetical extension of the No. 26 scale. This basis for measurement and comparison of viscosity is adopted herein.

Typical of the fluid proteinous glues used heretofore in the cold process are the soya bean flour glues which are standard in the manufacture of fir plywood. These glues have a No. 26 wire viscosity usually about 40 with a range between 25 and 150. In contrast to these quite fluid glues the semi-fluid glues of the present invention are too thick to be measured with the No. 26 wire as they would break it. They have to be measured with the heavy No. 18 gauge wire and give readings usually about 25 with an approximate range between 10 and 90. At and above a No. 18 wire reading of about 180 a plastic state is reached which is stiff enough to begin to permit the glue to be roled out by smooth rollers in a sheet so that such material might be applicable to the previously mentioned sheeting process proposal.

Consequently a comparison of the consistency of ordinary fluid glues, the semi-fluid glues of the present invention and the plastic glues previously proposed for application by the sheeting process becomes possible by taking the No. 26 gauge wire readings of the fluid glues and comparing the No. 18 gauge wire readings of the semi-fluid and sheeting process glues by multiplying the No. 18 gauge readings by 37. These results are as follows:

|  | Range No. 26 wire readings, or hypothetical equivalent at room temperatures |
|---|---|
| Fluid glues | 25– 150 |
| Semi-fluid glues | 370–3330 |
| Sheeting process glues | 6600–upper limit unknown |

As heat reduces the viscosity of glues very materially, semi-fluid glues which are above the practical upper limit at room temperature may be made temporarily spreadable by heating.

It thus becomes apparent that the semi-fluid glues of the present invention form an intermediate band of consistency, separated by a very wide gap from the fluid glues and a very wide gap from the material suggested for the sheeting process. It has in fact been found that it is only within this band that the full benefits of the semi-fluid glues are obtained. This is because the present process depends on accurate controlled spreading of the glue by grooved rollers in the form of narrow ridges of only semi-fluid glue, these ridges being alternated by narrow areas freed from excess glue beyond the minimum amount which merely wets their surfaces, by the contacting pressure of the corresponding ridges of the spreader rollers. With ordinary viscosity glues similarly spread, the fluid glue immediately flows back and partly or wholly refills these valleys and it is also easily disturbed and smeared by the contacts of assembly handling, while with our semi-fluid glues not only do these valleys remain empty so that a distinct printed pattern is obtained, but the semi-fluid glue is too stiff to be readily smeared in handling. Thus if, as in the case of ordinary fluid glues, the fluidity exceeds a certain limit, the pattern is not fully obtained or retained, while if it is too little, as in the case of the sheeting process proposal, the pressure required to produce a pattern far exceeds the strength of the wood and it is consequently injured or destroyed. Considerable differences in spreadability, however, arise from other causes than mere viscosity or frictional resistance to flow, so that while this principle holds true, the upper and lower limits of spreadability are modified somewhat by the composition of each individual glue. However, in all cases a distinct and considerable gap remains between the fluid and semi-fluid glues, and a distinct and wide gap between the latter and the glues suitable for the sheeting process. The differences are in the presence or absence of definite behavior functions and not mere differences of degree, and it is only within this distinct band of consistency that true pattern spreading makes possible the important advantages obtainable by the present process.

For instance if the spreading character of a series of soya bean glues is compared, and the series starts with ordinary fluid glues of about 3.7 to 1 water to glue ratio and extends into the territory of the pattern spreadable semi-fluid glues, the spread character will change quite suddenly at some point between about 3.0 and 2.8 ratio from the smeary distorted semi-pattern of the fluid glues to the definite distinct undistorted print pattern of the semi-fluid glues. This change occurs when the ridges of glue cease to flow out into the substantially empty valleys. No doubt obscure relations of such factors as internal friction, surface tension and specific adhesion to the contacting surfaces cause the relatively sudden change which would be only gradual if dependent on some single factor like difference in degree of viscosity.

Such concentrated semi-fluid glues cannot be controllably spread by rollers having smooth surfaces, but can be spread by grooved roll surfaces if strongly pressed so the ridges contact the surfaces being spread. The present usage therefore includes application of the glue by what may be designated as "pattern-spreading" surfaces or pattern-rolls. In this, the glue applicator is in the form of rollers operated under sufficient pressure so as to contact the wood plies or other surface to be glued, and having a reticulated contour or series of small recesses or grooves which may extend in the direction of surface-travel, for instance grooves on the order of 1/32″–1/16″, and in close parallel relation, which may be crossed at intervals of for example 3/8″ to 1 1/4″ by transverse grooves, such roll surface being able to carry the adhesive and print it on the cellulosic surface in a corresponding pattern. With this, it will be noticed also that by reason of the alternate grooves and raised portions of the roll-contour, the adhesive pattern printed upon the surface to be glued, consists of a corresponding series of raised adhesive areas of glue ridges with spaces between; and with suitable proportion of the adhesive areas and spaces there is deposited upon the cellulosic surface a controlled amount of the adhesive in such areas that the subsequent pressure applied to the assembled glued structure will force the adhesive from the deposit-lines into the intervening spaces uniformly, the positive movement here involved thus thereby providing in secondary action with proper spacing a thin continuous or approximately continuous film of the adhesive in distribution between the adherent surfaces. Under certain circumstances such as in gluing paper the spacing between the ridges may be increased so as to exceed the area over which the ridges of glue may be pressed out, which is economical and adequate where weak materials such as paper are to be laminated or a weak bond is sufficient as in making thin plywood for box shooks. Fluid glues heretofore customary, are usually applied by quite similar grooved applicator rolls but due to the fluidity they initially smear over the cellulosic surface in an approximately complete coat which merely varies here and there in thickness, instead of a distinct definite pattern-spread or print with alternate surfaces free from excess glue. Due to the fluidity the glue is thus not definitely restricted in locations and is readily also smeared and displaced by the contacts which take place during the assembly of the component plies.

As indicated, the amount of water in the present adhesive is particularly low, for example less than 3.0 parts and usually less than 2.75 parts to 1 part of dry base adhesive. Hereinafter the term 'glue base' will be used to denote the dry adhesive base content exclusive of reagents. Desirably the proteinous base contains at least 50% of oilseed-residue flour, as soya bean flour, peanut flour, and the like, all of which contain a substantial proportion of material partially or completely undispersible in the concentration of alkali used in such glues. Straight seed flour may be used, or by inclusion of a portion of other protein, modified properties may be had, such animal proteins as blood-albumin, casein, animal glue, extracted vegetable proteins, etc. being applicable. With the limits of water content as indicated, the precise amount in any instance will vary somewhat with the particular adhesive composition, blood-albumin, casein, animal glue and extracted proteins for instance all having specifically different water-requirements, as well understood by those skilled in the art. Thus, with a straight soya bean or like oilseed-residue flour, the water content may be 2.00–3.00 parts to 1 of the oilseed flour, depending upon the consistency desired and the natural water-requirement of the individual glue base used. Depending somewhat upon the particular surface to be glued, whether of hard wood, soft wood, more absorbent cellulose in the form of paper board, paper, or less absorbent non-cellulosic porous material such as asbestos paper, etc., the water content may appropriately be varied, being more particularly restricted for high absorbent artificial cellulose sheet materials such as paper.

With the low water content semi-fluid adhesive, we also include the feature of a very low spreading rate. Customarily in the manufacture of plywood heretofore, for three-ply product, the spreading rate has been in excess of 25 pounds of dry glue base or 90–150 pounds of the liquid glue. Herewith however, a spreading rate of 7 to 24 pounds of dry glue base per 1,000 square feet of three-ply product becomes feasible or 30–90 pounds of the wet. For thinner and weaker cellulosic surfaces, as very thin plywood, paper, etc., correspondingly less is feasible, as for instance 2–12 pounds of the dry glue base depending upon the texture and character of the surface.

While as subsequently described, in most cases the present invention comprising the feature of semi-fluid glues pattern-spread at a low rate, contemplates the employment of a hot press method to form the final bond, under certain conditions the bond may be formed in the cold press as, for example in the case of certain paper products, by either cold or heated rollers. In such cases the great uniformity of spread obtained by the use of these semi-fluid glues and the ability provided to pattern spread them uniformly at even very low rates secure low glue costs. Furthermore, the heavy character of the glue and the small amount of water present facilitate rapid formation of the bond. In such instances, particularly with porous absorbent paper, the bond is formed rapidly by the thickening of the glue by the sudden driving out of the water into the porous surfaces upon the application of pressure so that heat is not needed to speed up the process.

Passing the layers to be glued through the adhesive-applying spreader rolls, and applying the adhesive, as indicated, the layers are then brought together in assembly, and proceed to the press. In this, an exceptionally high pressure is feasible and desirably applied. By reason of the fact that so small an amount of damaging water has been introduced into the cellulose by the adhesive, the assembled structure is able to withstand pressures of an order not otherwise nor heretofore permissible. The short time under pressure and low heat are features which also cooperate to this end. Thus, whereas in the manufacture of Douglas fir plywood customarily a pressure of about 140 pounds is not to be exceeded, in the present procedure 200–225 pounds per square inch is desirable. Under these controlled conditions the structure is not densified to its detriment, and a strong bond is quickly attained, the increased pressure contributing to a more effective gluing with a small amount of glue.

With the pressure, heat is applied, this being on an order sufficient to provide a quick heating of the adhesive without detrimental generation of destructive internal vapor pressure. Plate temperatures of 212–230° F. are applicable for instance with 3/10 fir panels. Actual peak temperatures at the glue line thus from about 170° F. to a maximum of a little above 212° F. result, and are suitable with general materials, and the heat is thus applied without substantial generation of vapor pressure, and the time under pressure may be relatively short, since the application of heat and pressure can be terminated before the glue line is completely dried out, and preferably as soon as a strong enough initial bond is formed to prevent separation of the plies on removal from the press. It is obvious of course, that on removing the panels from the press, the heat stored in the wood continues to dehydrate and strengthen the glue bond during the very considerable time that must elapse before the wood cools down to room temperature. Since it is usually convenient to store the panels in stacks, considerable heat remains present for as much as twelve hours. The time under pressure, correspondingly for $\frac{1}{16}$" thick fir wallboard can thus be less than 2 minutes and up to about 3 minutes, depending upon the particular glue composition, and exigencies of desirable procedure.

It is of particular note that the assembly time or interval between spreading and pressing, in the present process, while immediate pressing is not a rigid requirement as in the sheeting process, can be very short, and if desired can be substantially that involved in moving the assembly to the press, and being for example on the order of 30 seconds conveniently; but on the other hand the tolerance permissible may be more extended up to five minutes or even longer. The ability to press the panels as fast as they are glued and assembled is a feature of great value in large scale repetition manufacture as it facilitates continuous pressing by suitable apparatus capable of providing pressing facilities ready to receive and press the panels as fast as they are assembled, for instance on a short conveyor which delivers them to the continuous press. As the assembly time thus becomes uniform from panel to panel great advantages in uniformity of product are obtained together with the labor saving of continuous automatic pressing.

The glue bond, as seen, forms quickly, and the entire procedure from the beginning of appplication of the glue to the removal from the press need not require over 4 minutes in the case of wall board, and correspondingly less for thinner cellulosic structures. With three-ply wood, in general the pressing time may be less than 1 minute for each $\frac{1}{16}$" of assembly thickness where employing oilseed residue glues, the rate following closely the heat transfer rate through wood. Where adhesive blends are used including particularly easily heat coagulable proteins such as blood albumin, the pressing time may be much less. Withal, the ultimate bond provides strength equal to the best obtained with about double the dry glue base spread of the same glue base in the old practice heretofore, and it is particularly characterized by uniformity over the entire glued surface in contract to the prior unevenness.

As an example illustrative of operation for fir wallboard, 95 pounds of fine ground soya bean flour are dry mixed with 4 pounds of fine ground soda ash and 1 pounds of pine oil. 100 parts by weight of this dry powder are mixed with 200 parts of water, and 10 parts of hydrated lime separately mixed with 50 parts of water are added, followed by 4 parts of caustic soda separately dissolved in 10 parts of water, followed by 30 parts of "N" brand sodium silicate, and finally a mixture of 1.8 parts carbon bisulphide and 1.2 parts of carbon tetrachloride, the viscosity one-half hour after making up being 30 MacMichael with No. 18 wire and the ratio of water to glue base being 2.6/1. This is a heavy bodied semi-fluid glue of very good spreading properties. Dry 1/10" cores (moisture content about 3 per cent) are spread at the rate of 50 pounds of this wet glue per 1,000 square feet of three-ply panels, employing the reticulated or pattern-spreading rolls as above indicated, with sufficient pressure on the rolls to cause the core pieces to positively move forward and the semi-fluid glue to be spread at the same speed, and the pattern of adhesive is printed on the wood surface. The spread cores are laid on backs which have been placed if desired on a convenient conveyor, and a face ply is laid on the cores, forming the complete assembly, which is carried into a hot press. The press is immediately closed and about 200 pounds pressure per square inch of panel surface applied, the assembly time or elapsed time between the spreading of the cores and the application of pressure having been about 30 seconds. The press plates are heated to a uniform temperature of 225° F. After 140 seconds the press is opened and the panel removed.

In contrast, in the customary procedure using the prior cold process there would have been a 3.7 to 1 water to glue-base ratio and a minimum of about 130 pounds of liquid glue spread, since any attempt at reduction below such rate would seriously weaken the bottom panels in the cold process package. The percentage of dry glue base saved thereover by the present process is 50 per cent or more; and notably there is a reduction of at least 64 per cent in the amount of water injected into the structure, and whereas in the prior process the moisture content of the finished panels has run around 14–15 per cent, the moisture content of the present panels is but slightly over 7 per cent, and they are thus ready for shipping without a re-drying operation. It has been found also that this same glue may be spread on fire wallboard at the very low rate of 37½ lbs. instead of 50 lbs. and strongly glued fully commercial panels produced. Excellent results may also be obtained by omitting the caustic soda altogether in this formula and increasing the soda ash and lime proportionately. Many other formulae may also be used and the process is not limited to any specific glue formulas for alkaline proteinous glues, except that the viscosity should be within certain limits and the water kept correspondingly low. The advantages of this process are thus seen to be revolutionary from the standpoint of reduction in both glue consumed and glue water injected into the panels.

Concomitant with the avoidance of the large amounts of water, even thin plies do not have alkaline glue stains on any other surfaces than those actually contacted by the adhesive. For this reason also it is seen why even such surfaces as paper board and paper may be glued with these glues without becoming surface stained thereby. Also it is seen that the glue, although containing water is much less saturated, and is consequently in such general equilibrium that the cellulose absorbs water from the glue by contact at a much slower rate than with the usual watery glues. Again, the glue is printed uniformly on sharply defined spaced areas; and not irregularly distributed in an indefinite pattern which is distorted by flow due to the high fluidity and is also readily smeared and displaced during assembly and before pressing. In contrast to this, the present high viscosity, pattern spread, semi-fluid glue remains in the areas of deposit and is only squeezed over into the intervening spaces when the press is closed, thereby forming an approximately complete very thin film between the surfaces opposed and then the adhesive is at once set by the heat. In this high pressure confined lateral filming of the adhesive from the imprinted areas to the neighboring spaces a particularly close union of adhesive to the cellulose is effected. The uniformity of disposition due to the accurate pattern spreading and the resistance to displacement due to the high viscosity cooperate to secure uniform adhesion.

As indicated, the characteristics of very low spread of semi-fluid concentrated glue, with hot pressing for very short time, using moderate heat, and relatively high pressure, are applicable with the protein base aqueous alkaline glues in semi-fluid state, whether of wholly oilseed composition or mixed composition. In general, oilseed glues, by which is meant glues containing preferably at least 50 per cent of oilseed flour, are particularly advantageous due to the improved spreadability arising from their content of materials which do no completely disperse in the alkaline medium. This property of spreadability of the oilseed flour glues is presumably a purely physical characteristic derived from the reduction in sticky tenacious adhesive character due to the presence of the proportion of undispersed and only partly dispersed cellulose and hemi-cellulose in such flour. The effect seems to be to change the sticky stringy character of a low water pure protein dispersion to a more mushy, short and friable semi-fluid which certainly gives spreadability not ordinarily found with low water content dispersions of pure proteins such as casein and blood. However, some formulae do give the desired characteristics even with pure proteins and in such cases since the essential distinct pattern spread may be obtained, they become applicable to the present process. Also this character may be obtained with pure proteins in some instances, by additions of substances imparting this character, such for example as alpha flock, which is finely divided cellulosic material, or by formulation which leaves dispersion partly uncompleted.

We are unable to state definitely what characteristic is responsible for the excellent pattern spreading character of the seed flour glues and in view of the fact that we have produced similar spreading characteristics in straight protein glues such as casein and blood glues by chemical manipulation as well as mere additions of non-adhesive character, we do not wish to exclude such straight protein glues from the class of pattern spreadable semi-fluid glues. For the purpose of the present invention and in the appended claims the term semi-fluid glues should be construed as to mean pattern spreadable glues regardless of whether they contain oilseed residue flour or not, since all glues having the pattern spreadable characteristic are equivalently workable in our process. Blends may include casein, blood-albumin, animal glue, extracted protein, etc., in amounts preferably not exceeding the proportion of oilseed flour, as for instance 5-50 per cent of such blend constituents; for instance soya bean flour as main ingredient with 20 per cent of soluble blood-albumin and 5 per cent of animal glue is a useful blend, having excellent spreading properties and water resistance together with a quick setting property derived from the heat coagulable blood. Inclusion of larger amounts of blood-albumin still further increases the water resistance of the glued product. Casein, as noted, may also be used as blending element, with enhanced dry strength and water resistance. Blends including blood, animal glue, or casein, increase the tolerance of a long or variable interval of assembly time, which is desirable in some instances, and heat coagulable proteins where added to the composition give a quicker set so as to permit opening the press more quickly without detriment to the final bond. In its great reduction in amounts of glue spread, the process particularly facilitates the use of glue materials of more expensive character, and owing to the use of heat permits attainment of highly water resistant bonds also with materials which would produce only moderate water resistance in the cold press process.

In the annexed drawing:—

Figures 1, 2, and 3 illustrate stages in the process.

Employing the proteinous adhesive and of the viscosity described, the adhesive prints from the grooved rolls onto the cellulose surface in the pattern as illustrated in Figure 1 of the drawing, in which the adhesive deposit is shown at 2, defining excess glue areas, there being intervening spaces 3 merely wetted with the adhesive but free from any surplus glue.

Other modes of applying the principle of the invention may be employed, change being made as regards the details described, provided the features stated in any of the following claims, or the equivalent of such, be employed.

We therefore particularly point out and distinctly claim as our invention:

1. As a new means for gluing plies, a semi-fluid aqueous alkaline oilseed residue proteinous adhesive characterized physically by a No. 18 wire MacMichael viscosity between 10 and 90, said adhesive being substantially free of self flow.

2. The method of manufacturing ply material from porous cellulosic sheets which comprises spreading on a ply a multiplicity of spaced excess glue areas of a semi-fluid proteinous glue substantially free of self-flow and having a viscosity range, arrangement and amount such as to be free from self-flow upon the surface after application and be adapted to spread laterally under pressure into the spaces between the areas of excess glue under pressure to form a thin adhesive film substantially over the entire ply surface, applying to said surface another ply before the viscosity substantially changes from said range and then compressing the assembly sufficiently to spread the areas laterally to form a thin adhesive film.

3. The method of manufacturing ply material from porous cellulosic sheets which comprises spreading on a ply a multiplicity of excess glue areas of a semi-fluid proteinous glue substantially free of self-flow and having a MacMichael No. 18 wire viscosity between 10 and 90 at a rate of less than 45 pounds of wet glue per thousand square feet of single glue line, then assembling another ply with the first-mentioned ply and before the viscosity substantially changes from said range compressing the assembly sufficiently to spread the spaced areas laterally to form a thin adhesive film.

4. As a new means for gluing plies, a semi-fluid aqueous, alkaline proteinous adhesive characterized physically by #18 wire MacMichael viscosity between 10 and 90, and the water present being below substantially 3 parts water to 1 of the dry base adhesive, the adhesive when applied in a multiplicity of excess glue areas being substantially free of self-flow and spreadable under pressure to form a substantially continuous adhesive film.

5. The method of making ply material from porous cellulosic sheets, selected from a group consisting of paper and wood, which comprises applying to a surface of said material a multiplicity of spaced excess glue areas of a proteinous glue having a viscosity such as to be free from self-flow upon the surface after application, said excess areas being of a semi-fluid viscosity range such as to be substantially free of self-flow but adapted to spread laterally into the spaces between the areas of excess glue under pressure, applying another sheet of said material to the surface carrying the glue, and compressing the assembly sufficiently to spread the excess glue into a thin substantially continuous uniform adhesive film substantially coextensive with the surfaces of the sheet material.

6. The method as specified in claim 5 in which the glue embodies in the dry glue base at least 50% soyabean flour and has between 2 and 3 parts of water to each part of dry glue base.

7. The method of making ply material from porous cellulosic sheets, selected from a group consisting of paper and wood, which comprises applying to a surface of said material a multiplicity of spaced excess proteinous glue areas separated by areas merely wetted with the glue, the glue having a viscosity such as to be free from self-flow upon the surface after application, said excess areas being of a semi-fluid viscosity range such as to be substantially free of self-flow but adapted to spread laterally into the spaces between the areas of excess glue under pressure, applying another sheet of said material to the surface carrying the glue, and compressing the assembly sufficiently to spread the excess glue into a thin substantially continuous uniform adhesive film substantially coextensive with the surfaces of the sheet material.

8. The method of making ply material from porous cellulosic sheets, selected from a group consisting of paper and wood, which comprises applying to a surface of said material a multiplicity of spaced excess proteinous glue areas separated by areas merely wetted with the glue, the glue having a viscosity such as to be free from self-flow upon the surface after application, said excess areas being of a semi-fluid viscosity range such as to be substantially free of self-flow but adapted to spread laterally into the spaces between the areas of excess glue under pressure, applying another sheet of said material to the surface carrying the glue, and compressing the assembly sufficiently to spread the excess glue into a thin substantially continuous uniform adhesive film substantially coextensive with the surfaces of the sheet material and simultaneously with the compression applying heat to promote glue flow and penetration.

9. The method of making ply material from porous cellulosic sheets, selected from a group consisting of paper and wood, which comprises applying to a surface of said material a multiplicity of spaced excess proteinous glue areas separated by areas merely wetted with the adhesive, the glue having a viscosity such as to be free from self-flow upon the surface after application, said excess areas being of a semi-fluid viscosity range such as to be substantially free of self-flow but adapted to spread laterally into the spaces between the areas of excess glue under pressure, applying another sheet of said material to the surface carrying the glue, compressing the assembly sufficiently to spread the excess glue into a thin substantially continuous uniform adhesive film substantially coextensive with the surfaces of the sheet material, and simultaneously with the compression applying heat to promote glue flow and penetration and maintaining the heat below that which will generate disruptive internal vapor pressure.

10. The method of making ply material from porous cellulosic sheets, selected from a group consisting of paper and wood, which comprises applying to a surface of said material a multiplicity of spaced excess proteinous glue areas of a glue having a viscosity such as to be free from self-flow upon the surface after application and having a MacMichael No. 18 wire viscosity between 10 and 90 said excess areas being of a semi-fluid viscosity range such as to be substantially free of self-flow but adapted to spread laterally into the spaces between the areas of excess glue under pressure, applying another sheet of said material to the surface carrying the glue, and compressing the assembly sufficiently to spread the excess glue into a thin substantially continuous uniform adhesive film substantially coextensive with the surfaces of the sheet material.

11. The method of making ply material from porous cellulosic sheets, selected from a group consisting of paper and wood, which comprises applying to a surface of said material a multiplicity of spaced excess proteinous glue areas separated by areas merely wetted with the adhesive, the glue having a viscosity such as to be free from self-flow upon the surface after application and having a MacMichael No. 18 wire viscosity between 10 and 90, said excess areas being of a semi-fluid viscosity range such as to be substantially free of self-flow but adapted to spread laterally into the spaces between the areas of excess glue under pressure, applying another sheet of said material to the surface carrying the glue, and compressing the assembly sufficiently to spread the excess glue into a thin substantially continuous uniform adhesive film substantially coextensive with the surfaces of the sheet material.

12. As a new means for gluing plies, a semi-fluid aqueous, alkaline casein adhesive characterized physically by #18 wire MacMichael viscosity between 10 and 90, and the water present being below substantially 3 parts water to 1 of the dry base adhesive, the adhesive when applied in a multiplicity of excess glue areas being substantially free of self-flow and spreadable under pressure to form a substantially continuous adhesive film.

13. As a new means for gluing plies, a semi-fluid aqueous, alkaline blood adhesive characterized physically by #18 wire MacMichael viscosity between 10 and 90, and the water present being below substantially 3 parts water to 1 of the dry base adhesive, the adhesive when applied in a multiplicity of excess glue areas being substantially free of self-flow and spreadable under pressure to form a substantially continuous adhesive film.

14. As a new means for gluing plies, a semi-fluid aqueous alkaline adhesive comprising a blend containing oil seed flour and at least one of a group consisting of casein, blood and animal glue, characterized physically by #18 wire MacMichael viscosity between 10 and 90, and the water present being below substantially 3 parts water to 1 of the dry base adhesive, the adhesive when applied in a multiplicity of excess glue areas being substantially free of self-flow and spreadable under pressure to form a substantially continuous adhesive film.

15. As a new means for gluing plies, a semi-fluid aqueous alkaline adhesive comprising a blend containing oil seed flour and at least one of a group consisting of casein, blood and animal glue in amount of between substantially 5 and 50% of the total proteinous material characterized physically by #18 wire MacMichael viscosity between 10 and 90, and the water present being below substantially 3 parts water to 1 of the dry base adhesive, the adhesive when applied in a multiplicity of excess glue areas being substantially free of self-flow and spreadable under pressure to form a substantially continuous adhesive film.

THEODORE WILLIAMS DIKE.
HARRY GALBER.